United States Patent
Bedwell

(10) Patent No.: US 6,499,387 B2
(45) Date of Patent: Dec. 31, 2002

(54) UNIFIED MULTI-PIECE PISTON AND METHOD OF MANUFACTURE

(75) Inventor: Tommy J. Bedwell, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 2 days.

(21) Appl. No.: 09/800,338

(22) Filed: Mar. 6, 2001

(65) Prior Publication Data

US 2002/0124721 A1 Sep. 12, 2002

(51) Int. Cl.⁷ .................................................. F16J 1/04
(52) U.S. Cl. ........................ 92/216; 92/224; 29/888.04
(58) Field of Search ........................ 92/214, 216, 231, 92/232, 224; 123/193.6; 29/888.04

(56) References Cited

U.S. PATENT DOCUMENTS

| | | |
|---|---|---|
| 1,745,860 A | 2/1930 | Noble |
| 3,628,511 A * | 12/1971 | Fischer et al. ............. 92/231 |
| 3,805,677 A | 4/1974 | Clary et al. |
| 4,180,027 A | 12/1979 | Taylor |
| 4,508,019 A | 4/1985 | Kabele et al. |
| 4,961,408 A | 10/1990 | Parsons |
| 5,052,280 A | 10/1991 | Kopf et al. |
| 5,072,654 A | 12/1991 | MacGregor |
| 5,499,572 A | 3/1996 | Cobble |
| 5,628,577 A | 5/1997 | Ribeiro et al. |
| 5,839,351 A | 11/1998 | Nakada |
| 5,839,352 A * | 11/1998 | Ribeiro et al. ............. 123/193.6 |
| 5,913,960 A | 6/1999 | Fletcher-Jones |
| 6,182,630 B1 * | 2/2001 | Zhu et al. ................. 123/193.6 |
| 6,260,472 B1 * | 7/2001 | Zhu et al. ................. 92/231 |

FOREIGN PATENT DOCUMENTS

JP  01273859 A  * 11/1989  ............. F02F/3/00

* cited by examiner

Primary Examiner—Edward K. Look
Assistant Examiner—Thomas E. Lazo
(74) Attorney, Agent, or Firm—Reising, Ethington, Barnes, Kisselle, Learman & McCulloch, PC

(57) ABSTRACT

A method of manufacturing a piston for heavy-duty diesel engine applications comprises forming a piston body having a pair of pin bosses, and bonding separately formed skirt portions to the pin bosses. The resultant piston has the separately formed skirt portions united to the piston body in a monobloc piston construction.

23 Claims, 4 Drawing Sheets

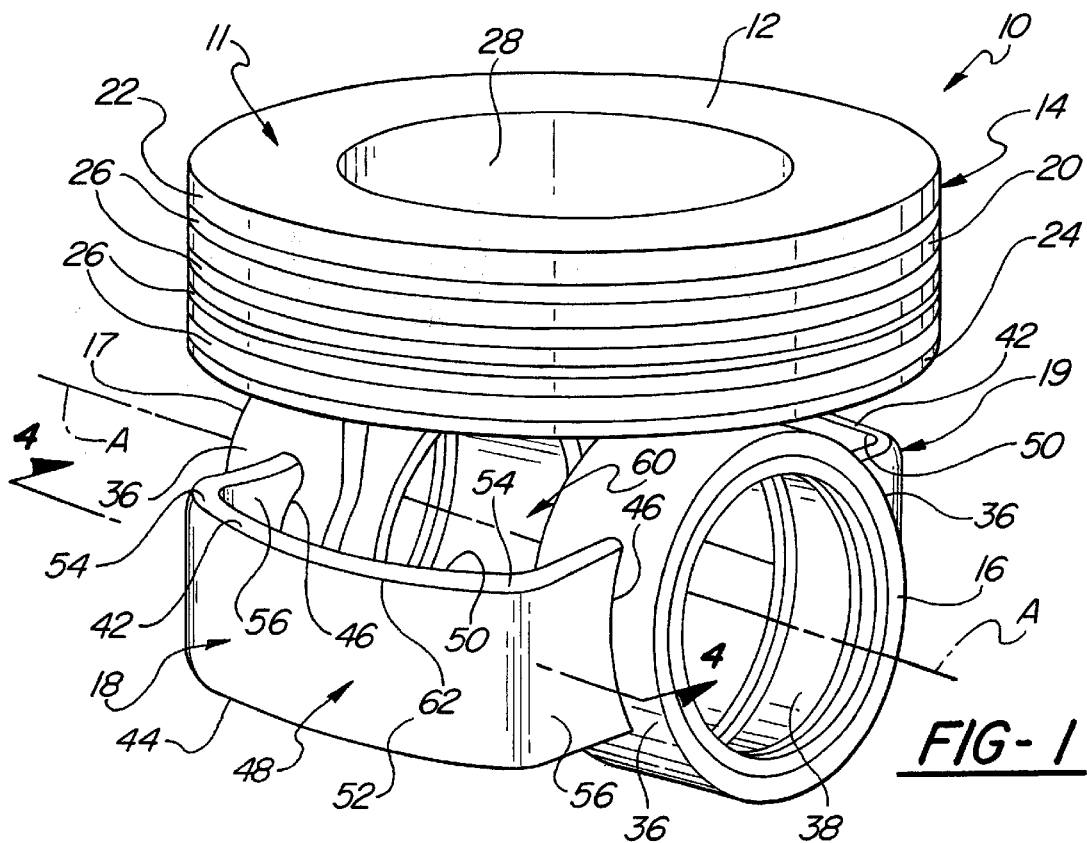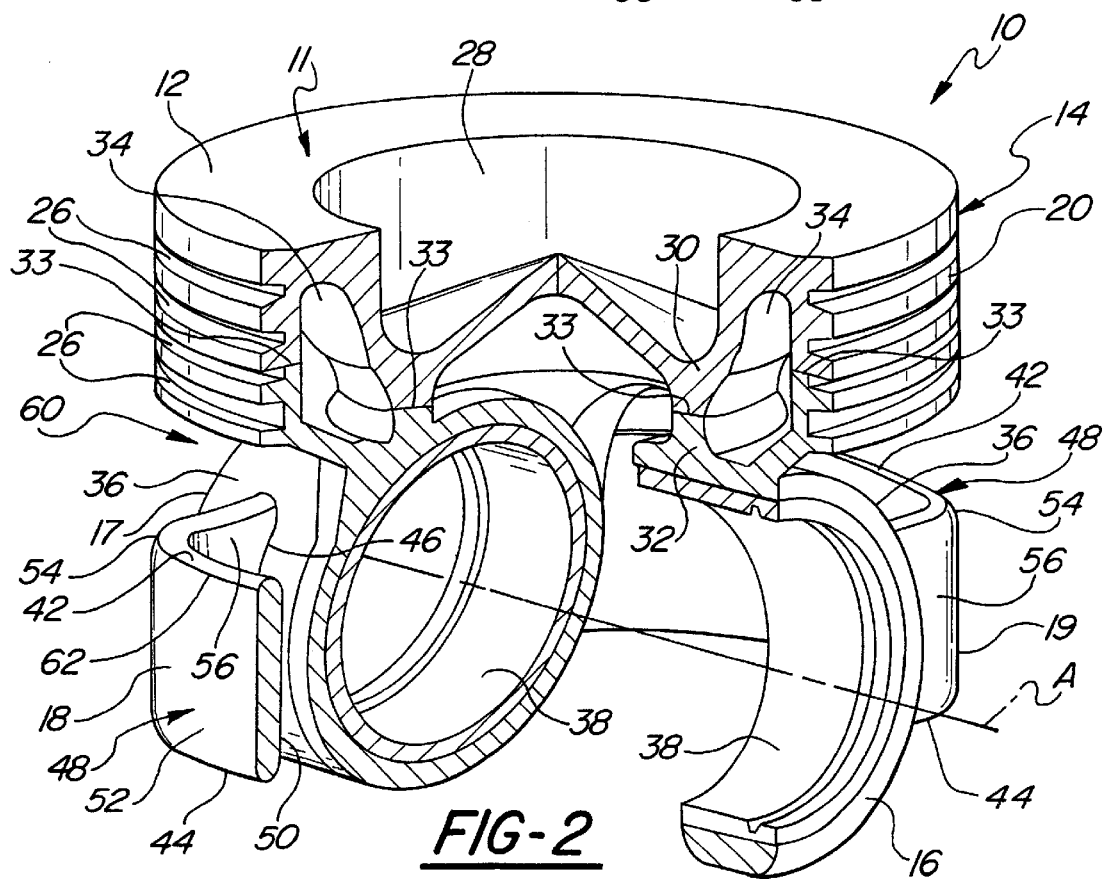

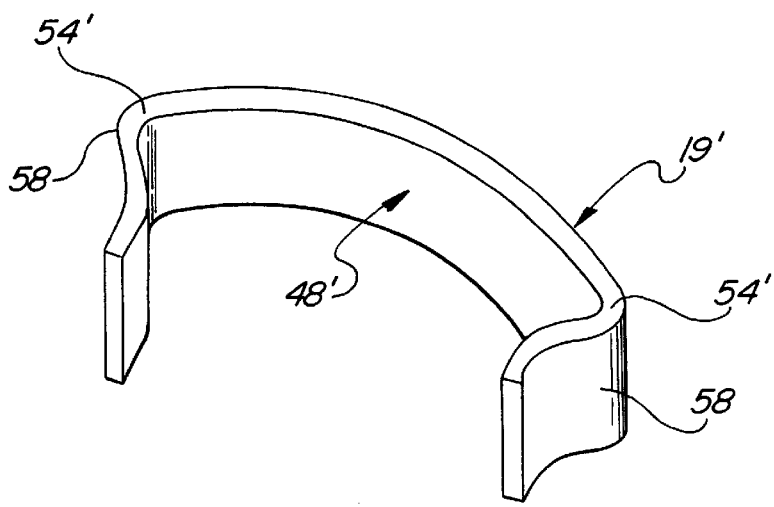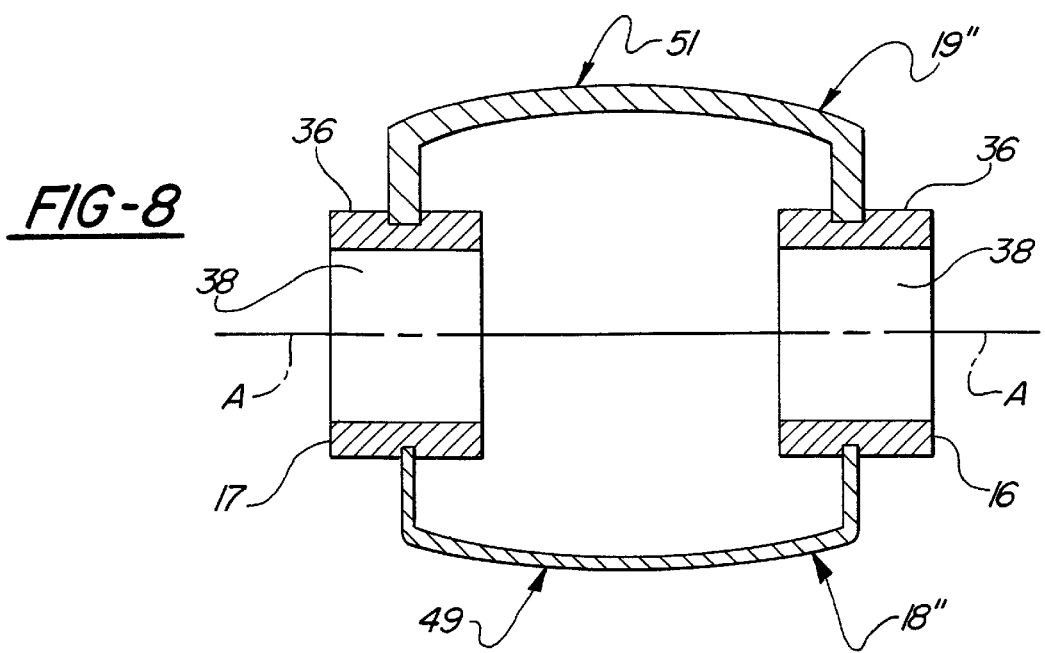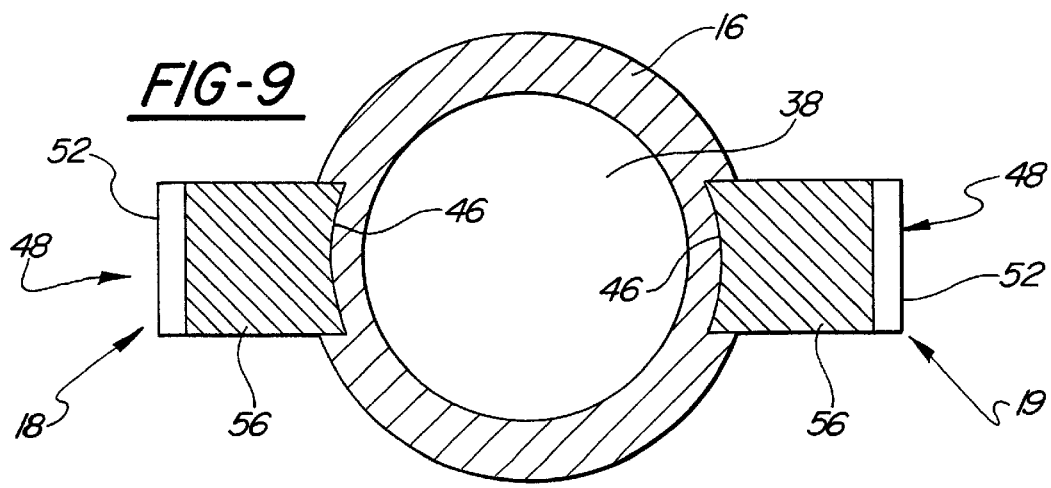

UNIFIED MULTI-PIECE PISTON AND METHOD OF MANUFACTURE

BACKGROUND OF THE INVENTION

1. Technical Field

This invention relates generally to pistons for heavy-duty diesel engine applications, and more particularly to a method of forming pistons in which the skirt is united with the piston body as a one piece structure.

2. Related Art

Pistons for heavy-duty diesel applications include an upper head formed with a ring belt having pin bosses depending therefrom for connecting the piston to a connecting rod of an engine. Such pistons also include a piston skirt that is formed either integrally as one piece with the head and pin boss portions known as a "monobloc" piston, or formed as a separate movable structure which is coupled in articulated fashion to the pin bosses by a wrist pin.

In monobloc pistons, the skirt is typically either cast or forged as one piece with the piston body and of the same material. Casting or forging the skirt as one piece with the piston body thus limits the material that can be used for the skirt and also limits the design options of the skirt to those capable of being either forged or cast with the piston body.

A piston constructed according to the present invention overcomes or greatly minimizes the above limitations of prior methods of making monobloc pistons, and particularly with respect to the formation the skirt.

SUMMARY OF THE INVENTION

A method of manufacturing a piston for heavy-duty diesel engine applications comprises forming a piston body having a pair of pin bosses, and bonding separately formed skirt portions to the pin bosses. The resultant piston has the separately formed skirt portions united to the piston body in a monobloc piston construction.

One advantage offered by this method of making a piston is the ability to form the skirt by stamping or rolling separately from the formation of the piston body, which may be cast or forged as usual. Forming the skirt in this fashion simplifies the construction and manufacture of monobloc pistons and lowers the cost.

Another advantage of the invention is that stamping or rolling of the skirt portions provides for a thin wall construction, contributing to a lighter piston assembly. The thin-walled skirt portions may also be elastically flexible to minimize scoring or marking of the cylinder walls.

Another advantage of the invention is that the opposing skirt portions may be fabricated to different specifications such that the skirt on a non-thrust side of the piston may have a thinner and lighter skirt portion than that on the thrust side.

Another advantage of the invention is that the skirt portions can be manufactured from any of a number of materials and are not limited to those used to form the piston body. In this way, the materials most suitable for the piston body and skirt can be separately selected and joined through bonding to provide optimum performance of both the piston body and skirt portions for a given application.

BRIEF DESCRIPTION OF THE DRAWINGS

These and other features and advantages of the present invention will become more readily appreciated when considered in connection with the following detailed description and appended drawings, wherein:

FIG. 1 is a perspective view of a piston constructed according to the present invention;

FIG. 2 is a partially sectioned perspective view of the piston of FIG. 1;

FIG. 7 is a perspective view of a skirt portion constructed according to a first alternative embodiment of the invention;

FIG. 8 is a cross-sectional view of a piston taken generally through the pin bosses and skirt portions as in FIG. 4 with the skirt portions constructed according to a second alternative embodiment of the invention; and FIG. 9 is a fragmentary cross-sectional view of a piston taken in a plane generally orthogonal to the pin bore axis A and through a pin boss and a pair of leg portions of the skirts constructed according to a third alternative embodiment of the invention.

DETAILED DESCRIPTION

Figure 3:
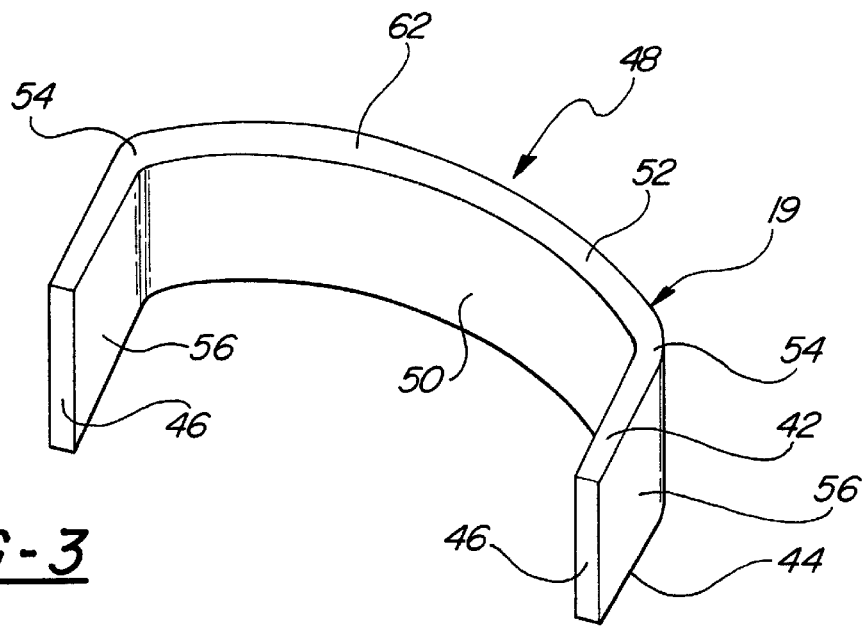
FIG. 3 is a perspective view of a skirt portion.

A piston constructed according to a first presently preferred embodiment of the invention is shown generally at 10 in FIGS. 1 and 2 and is particularly well suited for use in heavy-duty diesel engine applications. The piston 10 includes a piston body 11 having a head portion 12 formed with an annular ring belt 14 and a pair pin bosses 16, 17 spaced laterally in relation to each other and depending from the head portion 12. A pair of skirt portions 18, 19 are fabricated separately from the pin bosses 16, 17 are bonded to the pin bosses 16, 17 of the piston body 11, as will be explained in greater detail below.

The annular ring belt 14 has an outer cylindrical surface 20 of predetermined diameter extending axially of the piston 10 between an upper end 22 and a lower end 24. A plurality of ring grooves 26 are formed in the ring belt 14 for accommodating compression rings and an oil ring (not shown), in conventional manner. A combustion bowl 28 is formed in the top of the head portion 12.

Referring to FIG. 2, the head portion 12 includes an upper crown section 30 and a lower crown section 32. The upper crown section 30 is preferably formed separately from the lower crown section 32 and is subsequently joined thereto by bolting, brazing, bonding, threading, or by a friction weld joint 33, which is preferred, in the general manner disclosed, for example, in U.S. Pat. 5,150,517, the disclosure of which is incorporated herein by reference in its entirety. The two sections 30, 32 preferably define at least one internal chamber 34 provided with passages extending into the chamber 34 from below to accommodate the flow of cooling oil into and out of the chamber 34 for cooling the head portion 12 of the piston 10.

Figure 4:
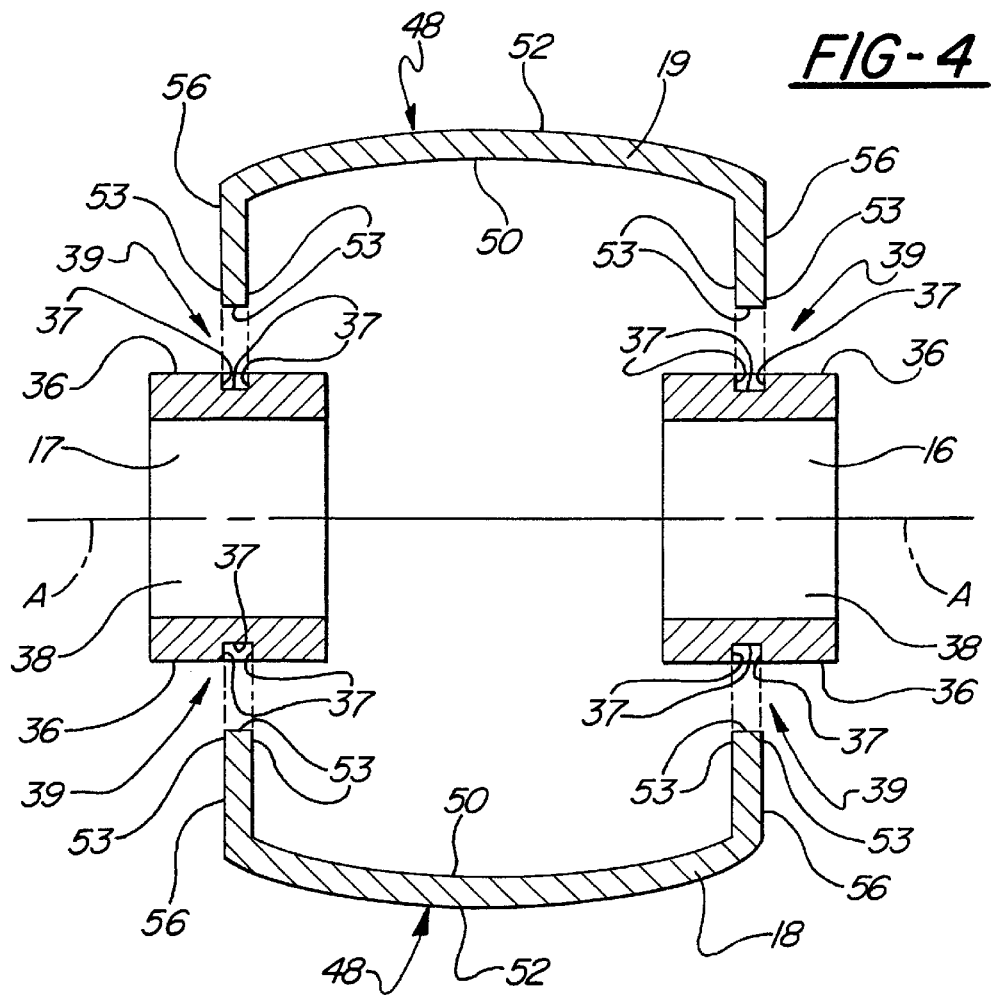
FIG. 4 is an exploded cross-sectional plan view taken generally along lines 4—4 of FIG. 1 showing the skirt portion in the pre-assembled condition.

The pin bosses 16, 17 have opposite outwardly facing side portions 36 extending generally parallel to a longitudinal axis A of the pin bosses 16, 17 on opposite sides of the axis A, as best shown in FIG. 4. The pin bosses 16, 17 depend from and are formed as one piece with the lower crown section 32. The pin bosses 16, 17 have coaxially aligned pin bores 38 about the pin boss axis A to accommodate a wrist pin (not shown) for connecting the piston 12 to a connecting rod (not shown) in known manner.

Figure 5:
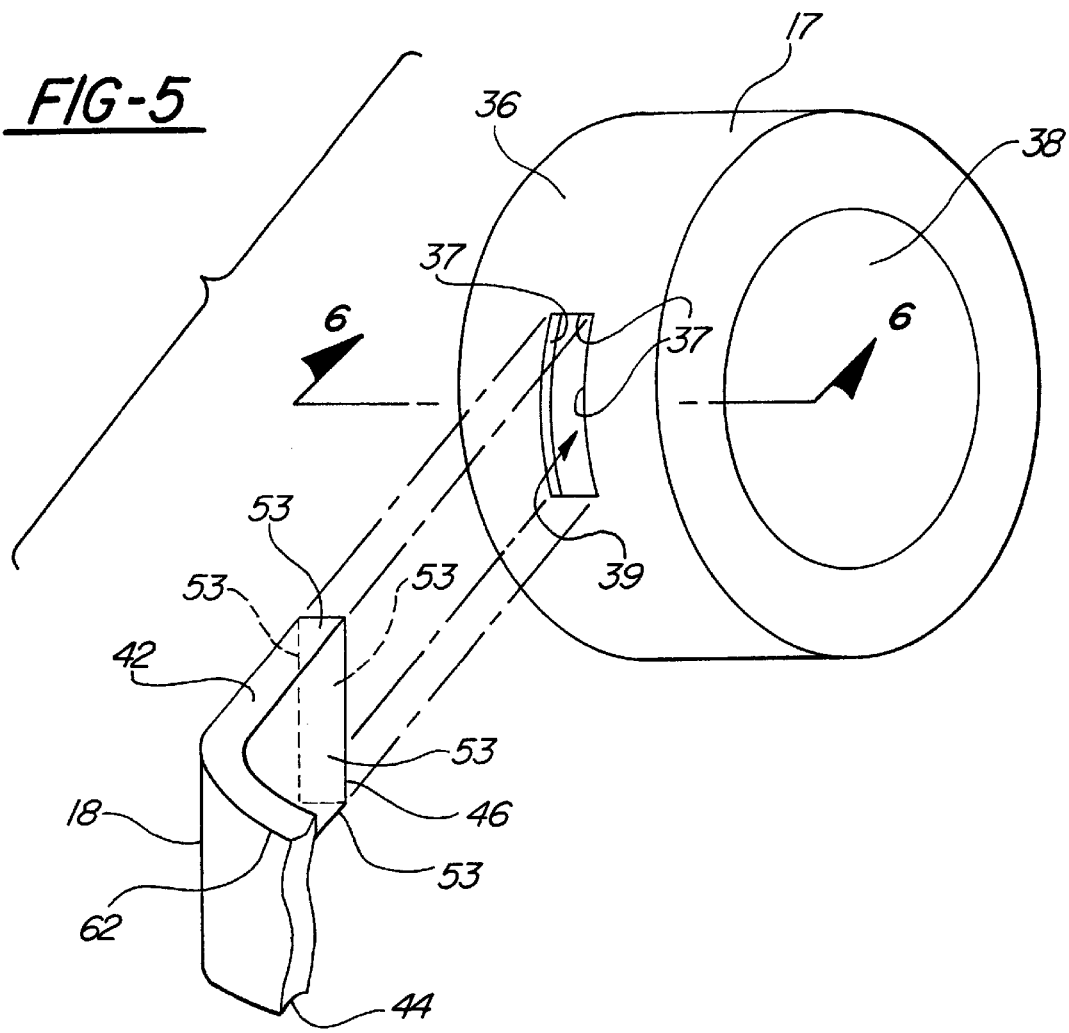
FIG. 5 is an enlarged fragmentary exploded perspective view of a pin bore portion of the piston prior to connection with the skirt portion.
Figure 6:
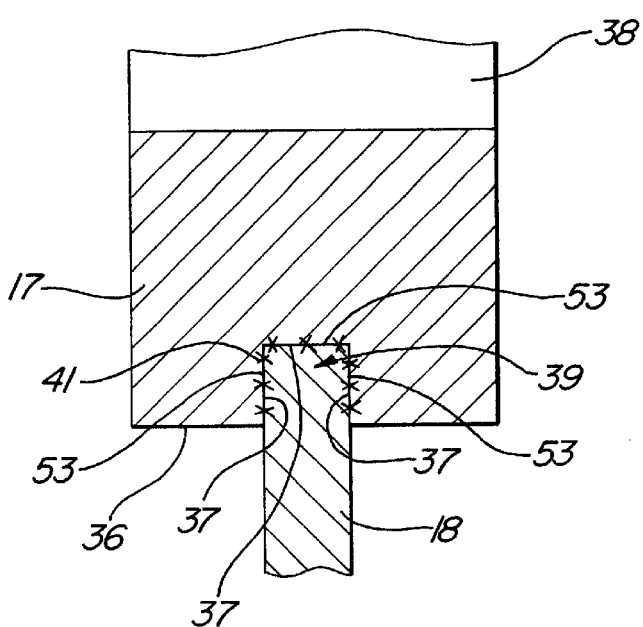
FIG. 6 is an enlarged fragmentary cross-sectional view taken generally along lines 6—6 of FIG. 5 showing the skirt portion bonded to the pin boss portion.

As best shown in FIGS. 4–6, the side portions 36 of the pin bosses 16, 17 each preferably present a bonding surface 37 to facilitate attachment of the skirt portions 18, 19 to the pin bosses 16, 17. The bonding surfaces 37 are generally formed by a recess or pocket 39 in the side portions 36 of the pin bosses 16, 17. The pockets 39 are shaped and sized to receive a portion of the skirt portions 18, 19 which is discussed in more detail hereafter. While it is preferred that the pockets 39 be included to provide a secure and rigid point of attachment of the skirt portions 18, 19 to the pin bosses 16, 17, it should be appreciated that the skirt portions 18, 19 can be attached directly to the side portions 36 of the pin bosses 16, 17 without assistance of pocket formations.

As best shown in FIG. 3, the pair of skirt portions 18, 19 have a top edge 42, a bottom edge 44, generally opposed free ends 46, and an arcuate sidewall portion 48 therebetween. The sidewall portion 48 of each skirt portion 18, 19 has an inner concave surface 50 and an outer convex surface 52 defining a thickness of the sidewall portion 48 and leads to generally parallel legs 56 at the free ends 46 of the skirt portions 18, 19. The sidewall portion 48 is disposed radially outwardly from the pin bosses 16, 17 by the legs 56 and is aligned with the cylindrical surface 20 of the ring belt 14. As shown in FIG. 7, a first alternative embodiment of the skirt portion 19' has a similar arcuate sidewall portion 48', but with ends 54' that bow outwardly defining an arcuate section 58 which can serve as a spring to facilitate controlled flexing of the sidewall portion 48'. A second alternative embodiment of the skirt portions 18", 19" is shown in FIG. 8. One skirt portion 18" includes a thin sidewall portion 49 and the other skirt portion 19" includes a thicker sidewall portion 51. The thicker walled skirt portion 18" can be employed on the thrust side of the piston 10, whereas the thinner walled skirt portion 19" can be employed on the non-thrust side. This provides for optimum design and weight reduction in consideration of the thrust and non-thrust sides of the piston 10.

The free ends 46 of the skirt portions 18, 19 define laterally spaced bonding surfaces 53 and are permanently bonded to the prefabricated pin bosses 16, 17 preferably in the pockets 39 formed in the side portions 36 of the pin bosses 16, 17, as best shown in FIGS. 4–6. Preferably, the skirt portions 18, 19 are permanently and immovably joined to the pin bosses 16, 17 by welding to define a unifying bond joint 41 between the skirt portions 18, 19 and pin bosses 16, 17.

The invention contemplates the employment of various welding techniques to form the weld joints 41, including resistance welding, laser welding, brazing, MIG, TIG, metallurgical bonding with or without a filler material, and the like. In any case, the skirt portions 18, 19 become permanently, immovably united with the pin bosses 16, 17 as a one piece structure. Once joined, they cannot be disassembled. Alternatively, the bond joints 41 can be formed with suitable adhesives that can withstand the high temperature operating environment of the piston 10, such as epoxies, resins, and the like.

The skirt portions 18, 19 are arranged so that one free end 46 of each skirt portion 18, 19 is bonded to one pin boss 16 and the other free end 46 is bonded to the other pin boss 17 to provide a unified piston skirt on the piston body 11. The skirt portions 18, 19 project radially outwardly from the side portions 36 and are on opposite sides of the pin bosses 16, 17 so that they directly oppose each other.

Preferably, a gap 60 is formed between the skirt portions 18, 19 and the lower end 24 of the ring belt 14 and the arcuate wall portion 48 between the leg portions 56 is unsupported and unattached to any other structure of the piston 10. As such, the skirt portions 18, 19 are each provided with an upper edge 62 spaced in uncoupled relationship to the ring belt 14. Alternatively, as shown by a third embodiment in FIG. 9, the separately formed skirt portions 18, 19 may be permanently joined to the pin bosses 16, 17 by insert molding. The free ends 46 of the skirt portions 18, 19 are supported in a mold cavity so that the pin bosses 16, 17 can be cast about the skirt portions 18, 19 and metallurgically united therewith as a resultant one-piece structure during casting.

Since the skirt portions 18, 19 are fabricated separately from the pin bosses 16, 17, the skirt portions 18, 19 can advantageously be made of a different material than that used to form the pin bosses 16, 17. The invention contemplates any of a number of materials suitable for making the skirt portions 18, 19, including steel, aluminum, carbon, plastics, ceramics, cermets, and the like, or a laminated structure of these materials, selected according to the particular application requirements. The skirt portions 18, 19 may be made of the same or different material than that used to form the pin bosses 16, 17.

The skirt portions 18, 19 can be separately manufactured by processes different that those used to form the piston body 11. Simple, low cost forming processes such as rolling or stamping can be employed to form the skirt portions 18, 19. The separately formed skirt portions 18, 19 can be made from lighter, thinner, stronger materials than that possible with conventional cast or forged skirts formed as part of the piston body 11.

Since the wall portions 48 are preferably unsupported between the leg portions 56 and unattached to any other structure of the piston body 11, the reduced wall thickness allows the wall portions 48 to flex radially against the mating cylinder wall surface like a spring under radial loads to facilitate guiding the piston along the cylinder wall and so as to prevent or minimize scoring or marking of the cylinder wall during operation. Additionally, the separate fabrication of the skirt portions 18, 19 allows the pin bosses 16, 17 to be formed closer to one another and thus enables use of a shorter wrist pin (not shown) and in turn further reduces the weight of the piston 10.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of manufacturing a piston for an engine, comprising:

fabricating a piston body having a piston head and a pair of pin bosses depending from the piston head in laterally spaced relation to one another;

fabricating a pair of skirt portions separately from the piston body with each skirt portion having laterally spaced bonding surfaces; and permanently joining the bonding surfaces of the skirt portions to the pin bosses of the piston body to unify the skirt portions with the piston body.

2. The method of claim 1 including forming the bonding surfaces of the skirt portions at laterally spaced free ends thereof wherein each skirt portion has a pair of free ends which define the bonding surfaces.

3. The method of claim 1 wherein the pin bosses each have side portions and the bonding surfaces of the skirts are bonded to the side portions.

4. The method of claim 1 wherein the skirt portions are unified with the piston body by welding the skirt portions to the pin bosses.

5. The method of claim 4 wherein the skirt portions are welded by laser welding.

6. The method of claim 1 wherein the skirt portions have arcuate sidewall portions.

7. The method of claim 6 wherein the sidewall portions are formed to have an inner surface and outer surface defining a thickness of the side wall portion, the sidewall portions having unequal thickness.

8. The method of claim 1 wherein the skirt portions are fabricated as resilient structures.

9. The method of claim 1 wherein the piston body and the skirt portions are formed from different materials.

10. The method of claim 1 wherein the pin bosses are formed by casting or forging and the skirt portions are fabricated by a process other than casting or forging.

11. The method of claim 1 wherein the piston body is formed by casting and the skirt portions are cast in place in such manner as to bond the skirt portions permanently to the pin bosses.

12. The method of claim 1 wherein the piston body is formed to include an upper crown and a lower crown with the pair of pin bosses depending from the lower crown.

13. The method of claim 12 including forming the upper crown separately from the lower crown and joining the crown portions together.

14. The method of claim 13 wherein the upper crown is joined to the lower crown by friction welding.

15. The method of claim 14 wherein the joining of the lower crown to the upper crown is performed in a separate operation from the bonding of the skirt portions to the pin bosses.

16. The method of claim 13 including forming at least one cooling gallery between the upper crown and the lower crown.

17. A method of manufacturing a piston for an engine, comprising:
prefabricating a piston body to include a piston head and a pair of pin bosses depending from the head in laterally spaced relation to one another;
prefabricating a plurality of skirt portions with each skirt portion having laterally spaced bonding surfaces; and
permanently bonding the bonding surfaces of the skirt portions to the pin bosses.

18. The method of claim 17 including fabricating the piston head and the skirt portions from different materials.

19. The method of claim 17 including forming the piston head from an upper crown portion and a separate lower crown portion, and joining the upper and lower crown portions together.

20. The method of claim 19 wherein the upper and lower crown portions are joined by friction welding.

21. The method of claim 20 wherein the friction welding of the crown portions is performed as a separate operation from the bonding of skirt portions to the pin bosses.

22. A piston comprising:
a piston body having a pair of laterally spaced pin bosses; and
a pair of skirt portions formed separately from said piston body and permanently bonded to said pin bosses as a united structure, wherein said skirt portions are welded to said pin bosses.

23. The piston of claim 22 wherein said piston body and skirt portions are formed from different materials.

* * * * *